(12) United States Patent
Naito et al.

(10) Patent No.: US 9,251,954 B2
(45) Date of Patent: Feb. 2, 2016

(54) JIG FOR MANUFACTURING CAPACITOR ELEMENT AND METHOD FOR MANUFACTURING CAPACITOR ELEMENT

(75) Inventors: Kazumi Naito, Minato-ku (JP); Masahiro Suzuki, Minato-ku (JP); Katsutoshi Tamura, Minato-ku (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/368,819

(22) PCT Filed: Sep. 5, 2012

(86) PCT No.: PCT/JP2012/072587
§ 371 (c)(1),
(2), (4) Date: Sep. 3, 2014

(87) PCT Pub. No.: WO2013/099361
PCT Pub. Date: Jul. 4, 2013

(65) Prior Publication Data
US 2014/0366350 A1    Dec. 18, 2014

(30) Foreign Application Priority Data

Dec. 28, 2011   (JP) ................. 2011-288070

(51) Int. Cl.
*H01G 4/005* (2006.01)
*H01G 9/00* (2006.01)
(Continued)

(52) U.S. Cl.
CPC ............... *H01G 4/005* (2013.01); *C25D 17/06* (2013.01); *H01G 9/0029* (2013.01); *H01G 9/0032* (2013.01); *H01G 9/0036* (2013.01); *H01G 9/07* (2013.01); *H01G 9/15* (2013.01);
(Continued)

(58) Field of Classification Search
None
See application file for complete search history.

(56) References Cited

U.S. PATENT DOCUMENTS 4,896,813 A    1/1990  Saijo et al.
6,960,092 B1 *  11/2005  Hussain ............... G01R 1/0466
                                                            439/263

(Continued)

FOREIGN PATENT DOCUMENTS

EP    0 735 616 A2    10/1996
EP    1 865 519 A1    12/2007
(Continued)

OTHER PUBLICATIONS

Official Communication issued in International Patent Application No. PCT/JP2012/072587, mailed on Oct. 30, 2012.

(Continued)

*Primary Examiner* — Seahvosh Nikmanesh
(74) *Attorney, Agent, or Firm* — Keating and Bennett, LLP

(57) ABSTRACT

A jig for manufacturing a capacitor element is provided in which the productive efficiency is excellent due to a larger number of anode bodies that can be processed, and an immersion position (height) of the anode body with respect to the processing liquid can be controlled with high accuracy. A jig 10 according to the invention includes a substrate 11, a plurality of beam members 8 arranged on at least one surface of the substrate in parallel to each other, and a plurality of conductive sockets 1 mounted on the beam member 8. The plurality of sockets 1 are capable of electrically connecting to a power source supplying an electric current to a capacitor anode body. The socket 1 is provided with an insertion port 37 for electrically connecting a lead wire of a capacitor anode body, and the insertion port 37 is opened in a downward direction of the substrate 11.

10 Claims, 10 Drawing Sheets

(51) Int. Cl.
*H01G 9/07* (2006.01)
*H01G 9/15* (2006.01)
*C25D 17/06* (2006.01)
*H01G 9/052* (2006.01)
*H01G 13/00* (2013.01)

(52) U.S. Cl.
CPC ............ *H01G 13/006* (2013.01); *H01G 9/052* (2013.01); *H01G 13/00* (2013.01); *Y10T 29/417* (2015.01); *Y10T 29/53204* (2015.01)

(56) References Cited

U.S. PATENT DOCUMENTS

| | | | |
|---|---|---|---|
| 7,602,201 B2* | 10/2009 | Ysaguirre | G01R 1/0433 324/756.02 |
| 7,938,937 B2* | 5/2011 | Naito | H01G 9/0029 204/198 |
| 2012/0014036 A1 | 1/2012 | Naito et al. | |

FOREIGN PATENT DOCUMENTS

| | | |
|---|---|---|
| JP | 09-186053 A | 7/1997 |
| JP | 2011-238740 A | 11/2011 |
| JP | 2012-4534 A | 1/2012 |
| WO | 2010/107011 A1 | 9/2010 |
| WO | 2011/074512 A1 | 6/2011 |

OTHER PUBLICATIONS

Official Communication issued in corresponding European Patent Application No. 12863673.5, mailed on Sep. 14, 2015.
Official Communication issued in corresponding European Patent Application No. 14166614.9, mailed on Nov. 11, 2015.

* cited by examiner

JIG FOR MANUFACTURING CAPACITOR ELEMENT AND METHOD FOR MANUFACTURING CAPACITOR ELEMENT

TECHNICAL FIELD

The present invention relates to a jig for manufacturing a capacitor element used in manufacturing a capacitor element for use in, for example, a solid electrolytic capacitor, and also relates to a method for manufacturing a capacitor element using the jig for manufacturing a capacitor element.

BACKGROUND TECHNOLOGY

A capacitor used as a peripheral component of a CPU (central processing unit) for, e.g., a personal computer is desired to be high in capacity and low in ESR (equivalent series resistance) to suppress voltage fluctuations and lower heat generation at the time of passing of high ripples (ripples). As such a capacitor, an aluminum solid electrolytic capacitor, a tantalum solid electrolytic capacitor, etc., are used. It is known that such a solid electrolytic capacitor is constituted by an electrode (anode body) made of an aluminum foil having minute pores on the surface layer thereof or a sintered body formed by sintering tantalum powder having minute pores therein, a dielectric layer formed on the surface of the electrode, and another electrode (typically, a semiconductor layer) formed on the dielectric layer.

As a method for manufacturing the solid electrolytic capacitor, a method is known in which an end of a lead wire extending from an anode body is connected to the lower end portion of the supporting substrate of the anode body and a plurality of the supporting substrates are arranged vertically at equal intervals to arrange and fix the plurality of anode body in parallel in the direction of the side of the substrate, a dielectric layer is formed on the surface of the anode body, the anode body is immersed in a chemical conversion treatment solution, the anode body side is dealt as an anode and a voltage is applied between the anode and a cathode disposed in the chemical conversion treatment solution to form a dielectric layer on the surface of the anode body, and then the anode body in which the dielectric layer is formed on the surface is immersed in a semiconductor layer forming solution to thereby form a semiconductor layer on the surface of the dielectric layer of the anode body surface (See Patent Document 1).

The supporting substrate unlikely deforms due to the force of gravity in a vertically arranged state but likely deforms and bends in a horizontally arranged state.

Conventionally, in order to control the immersion position (height) at the time of immersing an anode body in a processing liquid such as a chemical conversion treatment solution, etc., with high accuracy, the supporting substrate was used in a vertically arranged position which unlikely causes deformation.

In cases where the immersion position (height) when an anode body is immersed in a processing liquid is not controlled with high accuracy, for example, the forming position of the semiconductor layer to be formed on the anode body becomes irregular for each product (especially height). A capacitor in which the semiconductor layer is formed exceeding the determined position on the anode body has a high probability of being defective and the yield is significantly decreased. Especially in a small anode body, it is desired that the immersion position (height) is controlled with a higher degree of accuracy.

PRIOR ART DOCUMENT

Patent Document

[Patent Document 1] International Publication Pamphlet No. 2010/107011

SUMMARY OF THE INVENTION

Problems to be Solved by the Invention

However, as described above, when forming a dielectric layer and a semiconductor layer on a plurality of anode bodies arranged in parallel and fixed to the lower end portion of a vertically arranged supporting substrate, since the anode bodies can be connected only to the lower end portion of the supporting substrate, there was a problem that the number of anode bodies to be processed by a single supporting substrate was small and therefore productive efficiency was low.

The present invention was made in view of the aforementioned technical background, and aims to provide a jig for manufacturing a capacitor element and a method for manufacturing a capacitor element excellent in productive efficiency due to a larger number of anode bodies that can be processed by a single substrate, which is capable of controlling an immersion position (height) of the anode body with respect to the processing liquid with high accuracy.

Means for Solving the Problems

To achieve the aforementioned objects, the present invention provides the following means.

[1] A jig for manufacturing a capacitor element, comprising:
a substrate;
a plurality of beam members arranged on at least one surface of the substrate in parallel to each other; and
a plurality of conductive sockets mounted on the beam member,
wherein the plurality of sockets are capable of being electrically connected to a power source supplying an electric current to a capacitor anode body, and
wherein the socket is provided with an insertion port for a lead wire of a capacitor anode body for use in electrically connecting the lead wire to the socket, the insertion port being opened in a downward direction of the substrate.

[2] The jig for manufacturing a capacitor element as recited in the aforementioned Item 1, wherein the beam member is 1.6 mm to 5.1 mm in width and 2 mm to 10 mm in height.

[3] The jig for manufacturing a capacitor element as recited in the aforementioned Item 1 or 2, wherein the beam member contains hard resin.

[4] The jig for manufacturing a capacitor element as recited in any one of the aforementioned Items 1 to 3,
wherein the power source is an electric circuit formed on at least one surface of the substrate, and
wherein each of the sockets is electrically connected to each of power sources, and is electrically insulated with each other except that the socket is connected to the power source.

[5] The jig for manufacturing a capacitor element as recited in the aforementioned Item 4, wherein the electric circuit is a constant current circuit.

[6] The jig for manufacturing a capacitor element as recited in the aforementioned Item 4 or 5, wherein the electric circuit is also a circuit for limiting a voltage every socket.

[7] A method for manufacturing a capacitor element, comprising:

a dielectric layer forming step of forming a dielectric layer on a surface of an anode body by energizing the anode body as an anode in a state in which the capacitor anode body is connected to the socket of the jig for manufacturing a capacitor element as recited in any one of the aforementioned item 1 to 6, the substrate is held horizontally with both longitudinal edge portions of the beam member gripped, and the anode body is immersed in a chemical conversion treatment solution.

[8] A method for manufacturing a capacitor element, comprising:

a semiconductor layer forming step of forming a semiconductor layer on a surface of a dielectric layer on a surface of an anode body by energizing the anode body as an anode in a state in which the capacitor anode body is connected to the socket of the jig for manufacturing a capacitor element as recited in any one of the aforementioned items 1 to 6, the substrate is held horizontally with both longitudinal edge portions of the beam member gripped, and the anode body is immersed in a semiconductor layer forming solution.

[9] A method for manufacturing a capacitor element, comprising:

a dielectric layer forming step of forming a dielectric layer on a surface of an anode body by energizing the anode body as an anode in a state in which the capacitor anode body is connected to the socket of the jig for manufacturing a capacitor element as recited in any one of the aforementioned items 1 to 6, the substrate is held horizontally with both longitudinal edge portions of the beam member gripped, and the anode body is immersed in a chemical conversion treatment solution, a semiconductor layer forming step of forming a semiconductor layer on a surface of a dielectric layer on a surface of the anode body by energizing the anode body as an anode in a state in which after the dielectric layer forming step, the substrate in a state in which the anode body is connected to the socket is held horizontally, and the anode body is immersed in a semiconductor layer forming solution.

[10] A method for manufacturing a capacitor in which the anode body and the semiconductor layer of the capacitor element obtained by the manufacturing method as recited in any one of the aforementioned items 7 to 9 are electrically connected to electrode terminals respectively and sealed except for a part of the electrode terminal remained.

Effects of the Invention

In the invention of Item [1], since a plurality of beam members arranged on at least one surface of the substrate are equipped, for example, when the substrate is held in a horizontal sate with both the longitudinal edge portions of the substrate in the longitudinal direction of the beam member gripped, the substrate becomes hard to cause deformation (distortion) such as deflection. Among other things, since the sockets are provided at the beam member hard to be deformed, the height position of each anode body becomes the same with excellent accuracy when the anode bodies connected to the sockets of the substrate of the jig for manufacturing a capacitor element in a horizontally held state are immersed into the processing liquid, thereby making it possible to control the forming height position of, for example, a dielectric layer and/or a semiconductor layer of the anode body so as to become the same height with excellent accuracy, which in turn can manufacture a high quality capacitor element.

Further, since the insertion port of the socket mounted on the substrate is open in a downward direction of the substrate, for example, it is possible to mount a number of capacitor anode bodies in a majority of the region of the substrate (approximately the whole surface). Since the number of anode bodies that can be processed by a single substrate is large, it is excellent in productivity.

In the invention of Items [2] and [3], the jig is an easy-to-handle configuration, and causes less deformation (distortion) of the substrate, which enables to control the the forming height of, example, the dielectric layer or the semiconductor layer of the anode body with a higher degree of accuracy to the same height.

In the invention of Items [4], since the electric power source is formed on the substrate, a space-saving system for manufacturing a capacitor element can be constituted. Furthermore, the individual socket is electrically connected to the individual electric power source, thereby making it possible to control the electric current to be supplied individually to the individual capacitor anode body.

In the invention of Item [5], since the electric circuit is a constant current circuit, there is an advantage that the error deviation of the obtained capacitor elements can be decreased.

In the invention of Item [6], the electric circuit is also a circuit for limiting the voltage per individual socket, so even if a relatively large electric current is applied, the maximum voltage value applied to the anode body is limited, so there is an advantage that the processing time for chemical conversion and/or semiconductor layer formation can be shortened.

In the invention of Item [7], the substrate of the jig for manufacturing a capacitor element is hard to cause a deformation (distortion) such as bending even if held in a horizontal state, the height position of each anode body can be the same with high accuracy when the anode bodies connected to the sockets in the horizontally held state are immersed in a chemical conversion treatment solution, thereby making it possible to control the forming heights of the dielectric layers of the anode bodies to the same heights with high accuracy, which in turn can manufacture a high-quality capacitor element.

In the invention of Item [8], the substrate of the jig for manufacturing a capacitor element is hard to cause deformation (distortion) such as bending even if held in a horizontal state, the height positions of anode bodies can be the same with high accuracy when the anode bodies connected to the sockets in a horizontally held state are immersed in a semiconductor layer forming solution, thereby making it possible to control the forming heights of the semiconductor layers of the anode bodies to the same height with high accuracy, which in turn can manufacture a high-quality capacitor element.

In the invention of Item [9], the substrate of the jig for manufacturing a capacitor element is hard to cause deformation (distortion) such as bending even if held in a horizontal state, the height positions of anode bodies can be the same with high accuracy when the anode bodies connected to the sockets in a horizontally held state are immersed in a processing liquid (a chemical conversion treatment solution, a semiconductor layer forming solution), thereby making it possible to control the forming heights of the dielectric layers of the anode bodies to the same height with high accuracy and also making it possible to control the forming heights of the semiconductor layers to the same height with high accuracy, which in turn can manufacture a high-quality capacitor element.

In the invention of Item [10], a high-quality capacitor in which the forming height of, e.g., a dielectric layer or a semiconductor layer of the anode body is controlled to a predetermined height with high accuracy can be manufactured.

EMBODIMENTS FOR CARRYING OUT THE INVENTION

An embodiment of a jig 10 for manufacturing a capacitor element according to the present invention is shown in FIGS. 1 to 6. The jig 10 for manufacturing a capacitor element is equipped with a substrate 11, and a beam member 8. The beam member 8 is provided with a plurality of conductive sockets 1, and mounted on the lower surface of the substrate 11.

Figure 4:
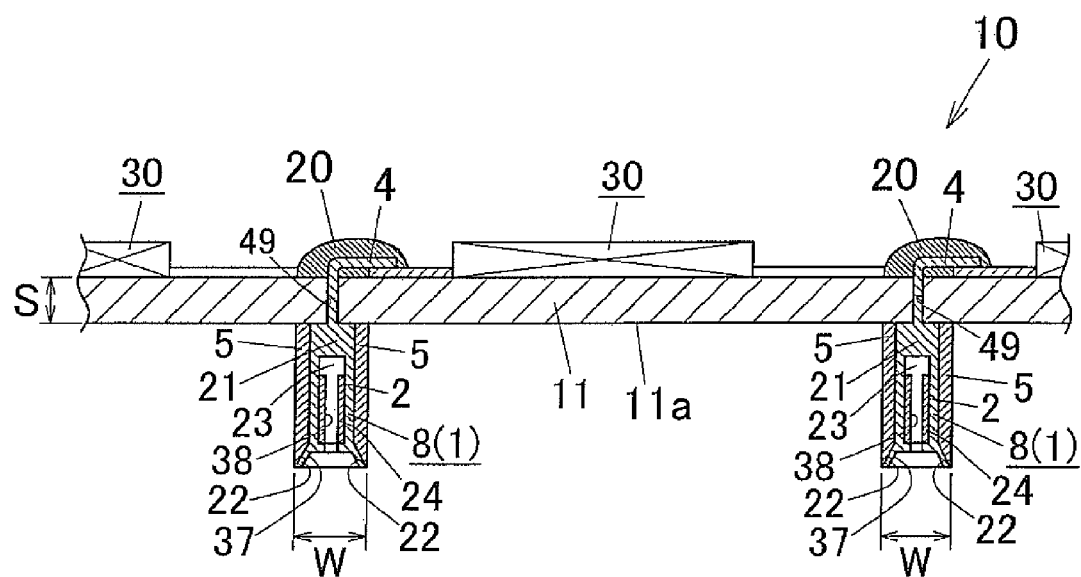
FIG. 4 is an enlarged cross-sectional view taken along the line X-X of FIG. 2.
Figure 6:
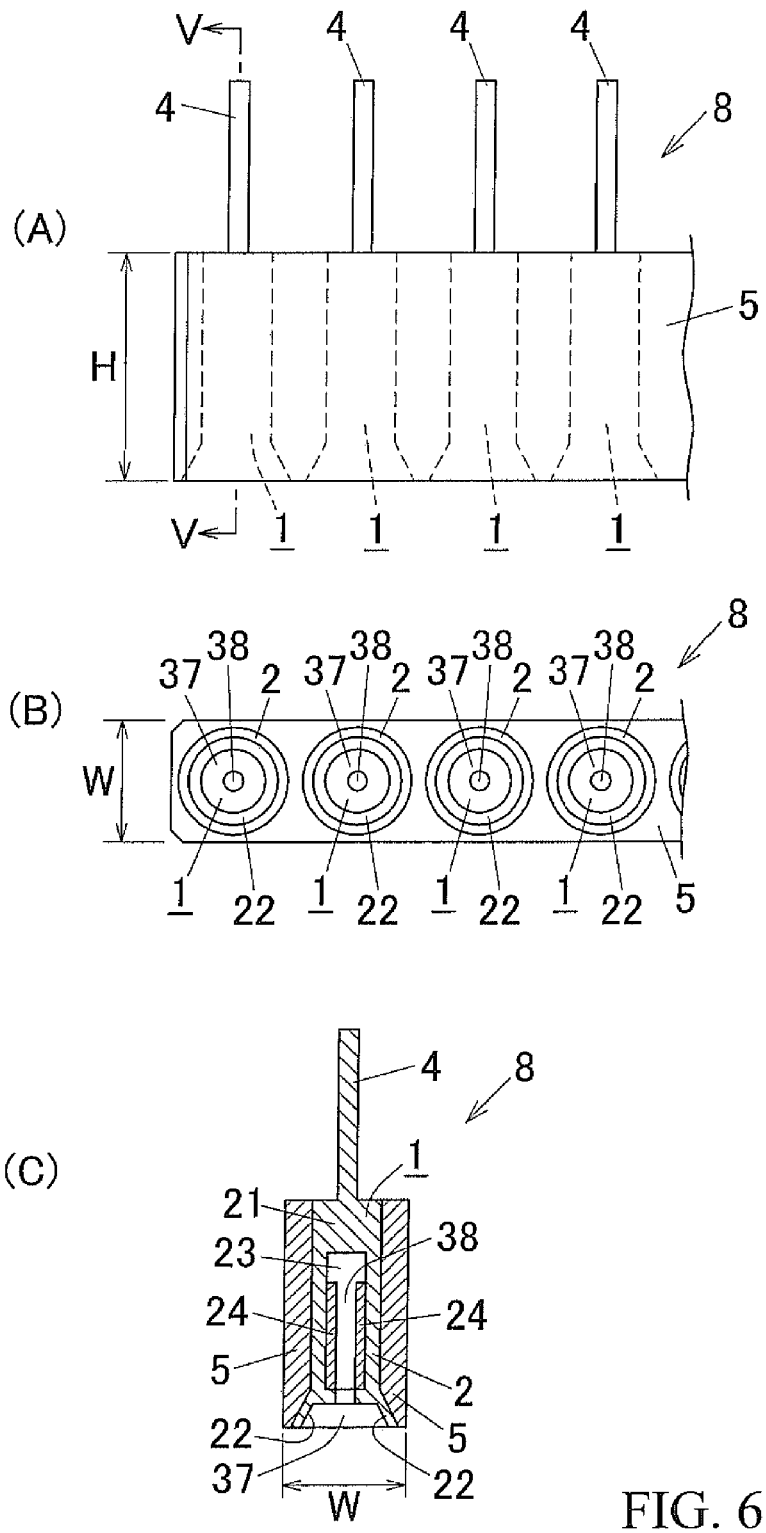
FIG. 6 is an enlarged view showing a beam member in which a sockets are embedded, wherein (A) is a front view, (B) is a bottom view, (C) is a cross-sectional view taken along the line V-V in (A).

The socket 1 includes a conductive socket main body 2 provided with a lead wire insertion port 37 on the lower surface thereof, an insulating portion 5 (a part of the beam member 8) covering a part of the socket main body 2 so as not to cover the insertion port 37, and a conductive lead wire portion 4 electrically connected to the socket main body 2 (see FIGS. 4 and 6).

Figure 3:
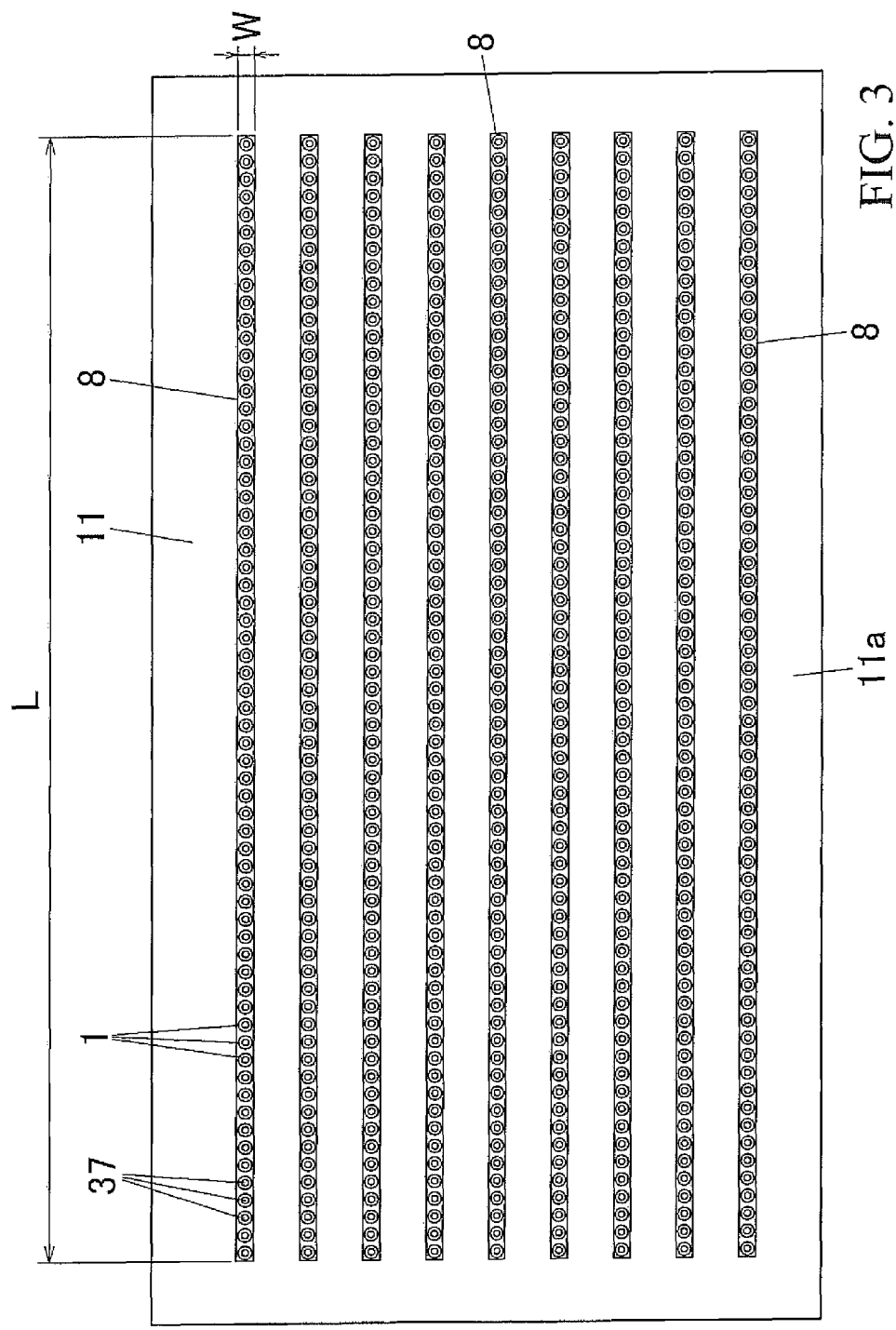
FIG. 3 is a bottom view showing the substrate in the mounted state.

In this embodiment, as the plurality of sockets 1, the beam member 8 in which a plurality of sockets 1 are embedded in parallel at equal intervals is used (see FIGS. 3 and 6).

Figure 2:
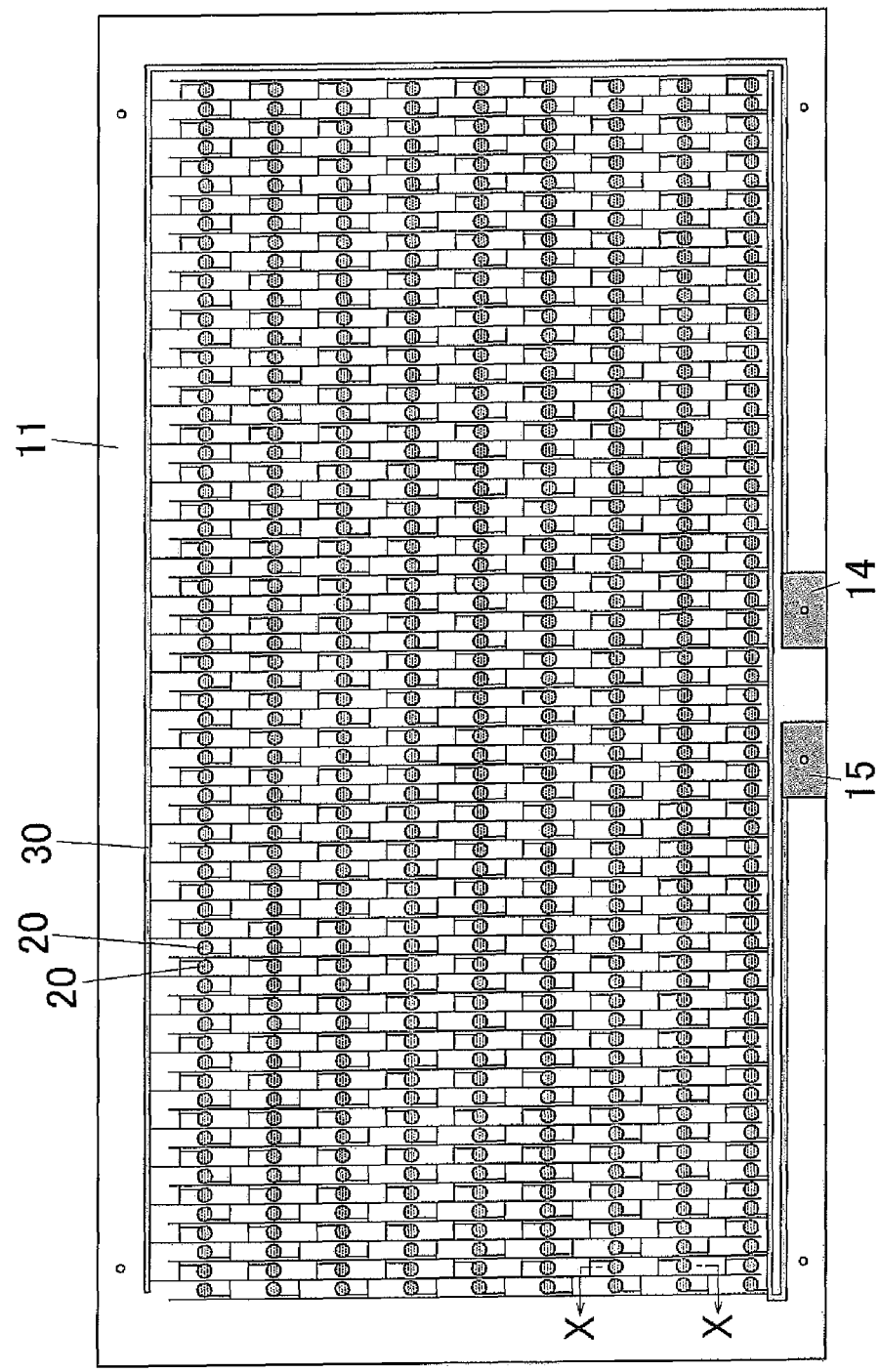
FIG. 2 is a top view showing a substrate in a mounted state.
Figure 5:
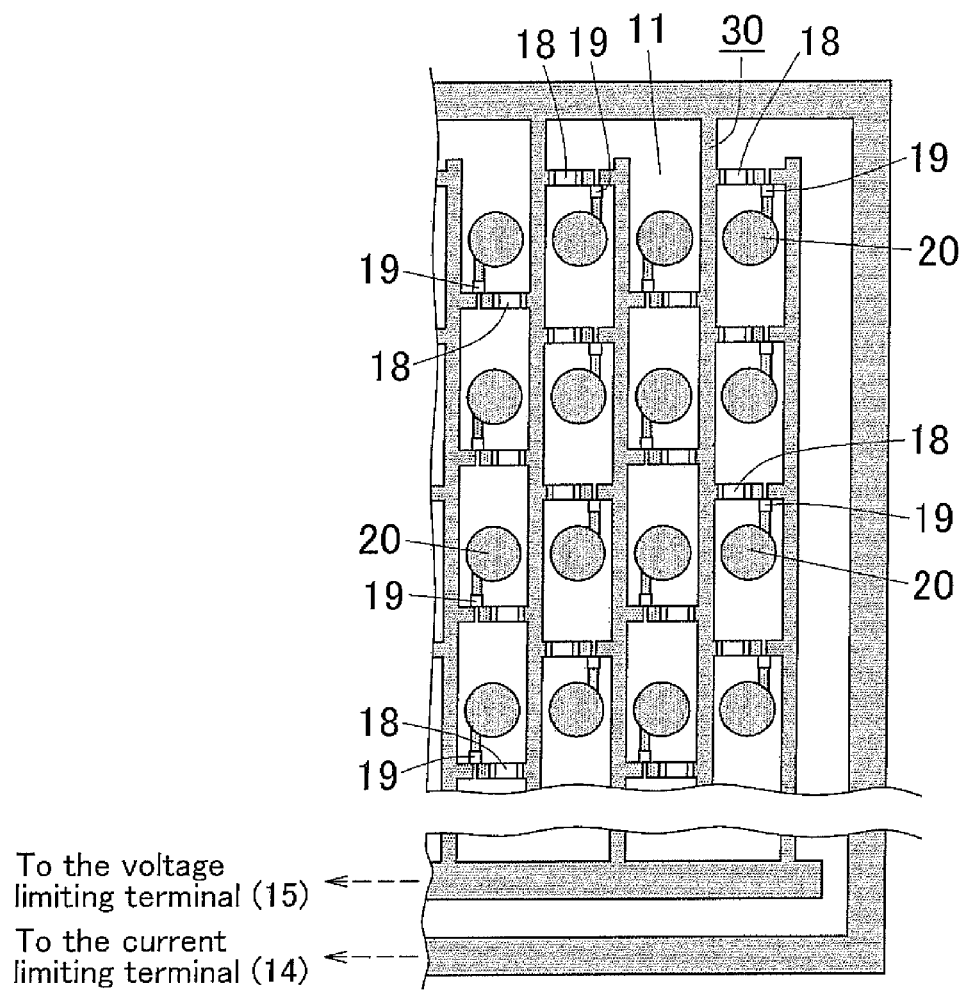
FIG. 5 is an enlarged schematic view showing a portion of an electric circuit shown in the top view of FIG. 2.

As shown in FIGS. 2 and 5, an electric circuit 30 having a pair of electric terminals 14 and 15 is formed on the substrate 11. The pair of electric terminals 14 and 15 are electrically connected to an electric power supply source 32 (hereinafter referred to as "electric power source") (see FIG. 9).

The electric circuit 30 includes a circuit that limits an electrical current (for example, a circuit, etc., shown in FIGS. 9 and 10) and supplies an electrical current independently to each anode body (conductor) 52 via the socket 1 and a lead wire 53 connected to the socket 1. That is, the electric circuit 30 limits the electrical current every individual socket main bodies 1.

Therefore, the maximum electric current value flowing to each anode body (conductor) 52 becomes the current limiting value of the electric circuit. As a circuit for limiting the electric current, a constant current circuit (for example, FIG. 9) is preferred to reduce the deviation of the obtained capacitor as much as possible.

Also, it is more preferable that the electric circuit 30 is a circuit for limiting the voltage every individual sockets 1. That is, it is more preferable that the electric circuit 30 is a circuit for limiting the voltage applied to each anode body (conductor) 52. In that case, even if a relatively large electric current is applied, the maximum voltage value applied to the anode body 52 is limited, so the processing time for chemical conversion and semiconductor layer forming can be shortened.

Figure 1:
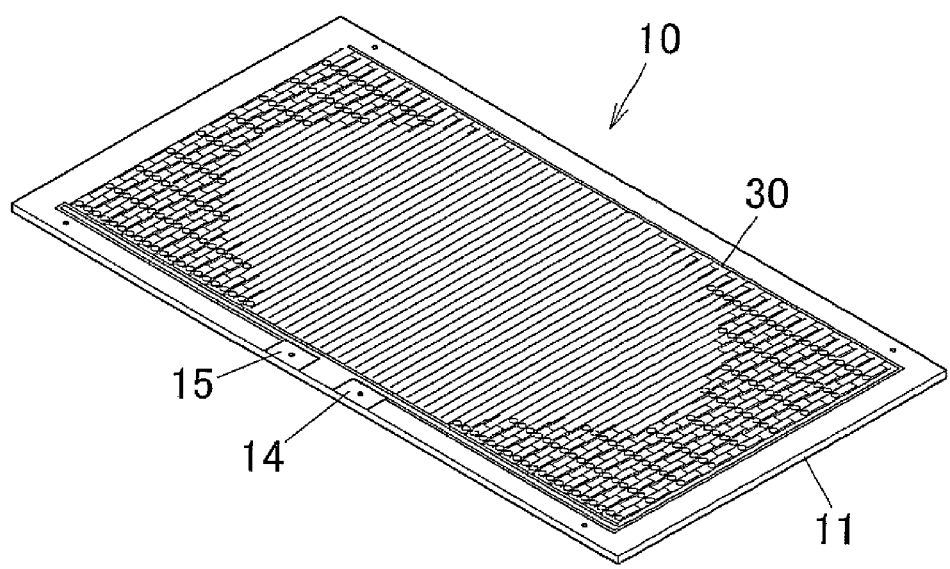
FIG. 1 is a perspective view showing an embodiment of a jig for manufacturing a capacitor element according to the present invention.

The pair of electric terminals 14 and 15 are provided on one end portion of the circuit board 11 in the widthwise direction thereof (see FIGS. 1 to 3). One of the electric terminals is a current limiting terminal 14, and the limiting value of the electric current is set according to the voltage applied to the terminal 14. The limiting value of the electric current can be set, for example, in the case of the circuit shown in FIG. 9, by the potential difference between the current limiting terminal 14 and the voltage limiting terminal 15 described later, and in the case of the circuit shown in FIG. 10, by the potential difference between the current limiting terminal 14 and the cathode plate 51.

The other electric terminal is a voltage limiting terminal 15, and the maximum voltage value applied to each anode body (conductor) 52 is limited by the voltage applied to the terminal 15. For example, in the case of the circuit of FIG. 9 and FIG. 10, it can be set by the potential difference between the voltage limiting terminal 15 and the cathode plate 51.

The details of the electric circuit 30 formed on the substrate 11 of this embodiment will be explained. As shown in FIGS. 2-5, and 9, a transistor 19 and a resistor 18 are mounted (attached) on the upper surface of the substrate 11, an emitter E of the transistor 19 is electrically connected to one end of the resistor 18, the other end of the resistor 18 is electrically connected to the current limiting terminal 14, a base B of the transistor 19 is electrically connected to the voltage limiting terminal 15, a collector C of the transistor 19 is electrically connected to the lead wire portion 4 of the socket 1. A basal end side part of the lead wire portion 4 is arranged inside the through-hole 49 formed in the substrate 11 (see FIG. 4).

In each of the plurality of through-holes 49 arranged in line (one line at one end side in the widthwise direction) along the longitudinal direction of the substrate 11, each lead wire portion 4 of the socket 1 embedded in the single beam member 8 is inserted from the lower surface side of the substrate 11. The tip end of the lead wire portion 4 is electrically connected to the electric circuit 30 (see FIG. 4). In each of a number of through-holes 49 arranged in the second line (second line from one end side in the widthwise direction) along the longitudinal direction of the substrate 11, each lead wire portion 4 of the socket 1 embedded in another single beam member 8 is inserted from the lower surface side of the substrate 11. The tip end of the lead wire portion 4 is electrically connected to the electric circuit 30 (see FIG. 4). As to a number of through-holes 49 of each line of the third and more lines, in the same manner, each lead wire portion 4 of the socket 1 embedded in the beam member 8 is inserted from the lower surface side of the substrate 11, and the tip end of the lead wire portion 4 is electrically connected to the electric circuit 30 (see FIG. 4). As mentioned above, the lead wire portion 4 is electrically connected to the electric circuit 30, so the socket 1 is electrically connected to the electric circuit 30 (see FIG. 4). Thus, the plurality of sockets 1 are mounted on the lower surface of the substrate 11 (see FIGS. 3 and 4). In this embodiment, the length direction of the substrate 11 and the length direction of the beam member 8 approximately coincide (including "perfectly coincide") with each other (see FIG. 3). The electrical connection of the tip end of the lead wire portion 4 and the electric circuit 30 is performed by a solder 20 (see FIGS. 4 and 5).

As shown in FIG. 4, the lead wire insertion port 37 of each of the plurality of sockets 1 mounted on the substrate 11 opens in the downward direction on the lower surface side of the substrate 11. When electrically connecting the lead wire 53 of the capacitor anode body 53 having the lead wire 53 to the lead wire insertion port 37 formed at the lower surface of the socket 1, the inserting direction of the lead wire 53 is a perpendicular direction with respect to the lower surface of the substrate 11 (see FIGS. 7 and 8).

Figure 9:
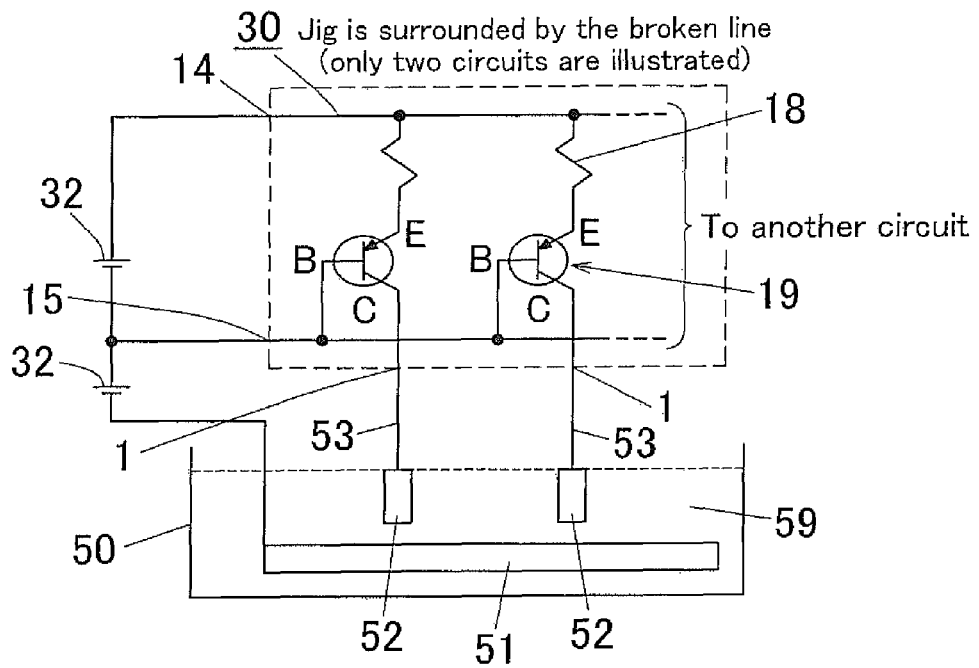
FIG. 9 is a schematic diagram showing the method for manufacturing a capacitor element of the present invention in an electrical circuit manner (only two circuits among the circuits in the jig for manufacturing a capacitor element are shown).
Figure 10:
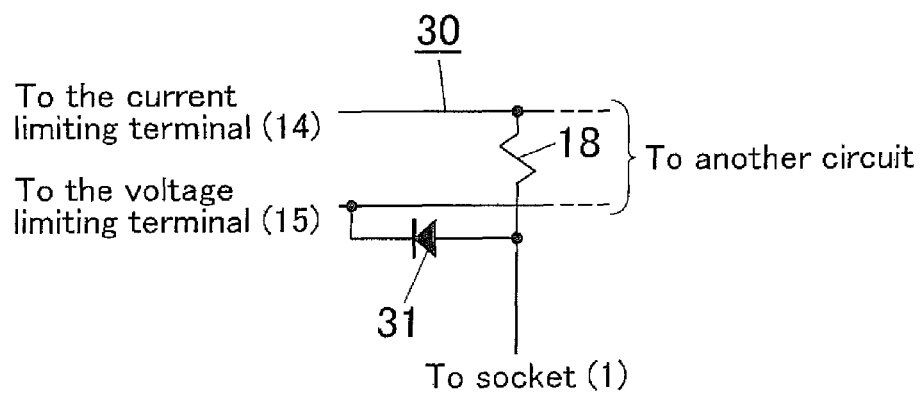
FIG. 10 is a circuit diagram showing another example of the electric circuit of the substrate of the jig for manufacturing a capacitor element.

In the present invention, the electric circuit 30 for the jig 10 for manufacturing a capacitor element is not especially limited to the structure shown in FIG. 9, and can be a circuit structure as shown in FIG. 10, for example. In FIG. 10, the reference numeral 31 denotes a diode.

In the present invention, the substrate 11 can be constituted by one sheet of a board or a laminated board in which a plurality of boards are laminated. In the case of employing a laminated board as the substrate 11, for example, the laminated board can be a laminated board in which adjacent boards are simply superposed without being adhered to each other, and also can be a laminated board in which adjacent boards are adhered to each other.

As the substrate 11, an insulating board is used. The material for the insulating board is not especially limited, but insulating materials such as phenolic resin, glass epoxy resin, polyimide resin, etc., can be exemplified, for example.

A socket 1 used in this embodiment is shown in FIG. 6. This socket 1 is provided with a conductive socket main body 2 and a conductive lead wire portion 4. In this embodiment, it is constituted such that a plurality of sockets 1 are embedded in the beam member 8 in parallel thereto (see FIG. 6).

The socket main body 2 is a member having the role as an electric connection terminal to electrically connect to the anode body (conductor) 52, etc., and is constituted by a conductive material such as a metallic material to attain electrical continuity. As the metal constituting the socket main body 2, it is not especially limited, but is preferable to use a metal (including its alloy) including at least one metal selected from the group consisting of copper, iron, silver and aluminum as a main component (containing 50 mass % or more). On the surface of the socket main body 2, at least one conventionally known plated layer, such as, e.g., a tin plated layer, a solder plated layer, a nickel plated layer, a gold plated layer, a silver plated layer, or copper plated layer, can be formed.

In this embodiment, the socket main body 2 includes a columnar portion 21 and an inclined surface portion 22 extending from the peripheral edge portion of the bottom surface of the columnar portion 21 downwardly so as to expand outwardly (see FIG. 6). The columnar portion 21 and the inclined surface portion 22 are made of a conductive material such as a metallic material, etc. By being surrounded by the inclined surface portion 22, the lead wire insertion port 37 is formed (see FIG. 6). Inside of the columnar portion 21, a hollow portion 23 having an opening at its bottom surface is formed. This hollow portion 23 is communicated with the space of the lead wire insertion port 37. On the inner peripheral surface of the hollow portion 23, a metal spring 24 is fitted, so a lead wire insertion hole 38 is formed by being surrounded by the metal spring 24. The lead wire insertion hole 38 is communicated with the space of the lead wire insertion port 37. When the lead wire 53, etc., of the anode body (conductor) 52 is inserted and arranged in the lead wire insertion hole 38 in a contact manner, the socket main body 2 and the anode body (conductor) 52 are electrically connected.

The lead wire portion 4 is extended from the center of the upper surface (upper surface of the columnar portion 21) of the socket main body 2 (see FIG. 6). The lead wire portion 4 is constituted by a conductive material such as a metallic material. That is, the lead wire portion 4 is integrally formed with the socket main body 2 and is electrically connected to the socket main body 2. As the metal constituting the lead wire portion 4, the same metals as exemplified as the metal constituting the socket main body 2 can be exemplified. The lead wire portion 4 is normally constituted by the same metal as the metal constituting the socket main body 2.

A part of the socket main body 2 is covered by the resin insulating portion 5 in a manner so as not to cover the lead wire insertion port 37. In this embodiment, the entire peripheral side surface of the socket main body 2 is covered by the resin insulating portion 5 (see FIG. 6).

Then, each lead wire portion 4 of the socket 1 is inserted into each through-hole 49 formed in the substrate 11 from the lower surface side of the substrate 11, and the upper surface of the beam member 8 is adhered to the lower surface of the substrate 11 with an adhesive agent. Thus, by fixing the upper surface of the beam member 8 (a plurality of sockets 1) to the lower surface of the substrate 11 in a manner to contact to the lower surface of the substrate 11, the socket 1 is mounted on the lower surface of the substrate 11 (see FIGS. 3 and 4).

The beam member 8 is equipped with the resin insulating portion 5 at least around the socket 1 to electrically insulate between sockets 1. The beam member 8 can be made by an insulating material to also constitute the insulating portion. As the material constituting the beam member 8 or the insulating portion 5, it is not especially limited, but is preferred to use an insulating material which is capable of easily performing the processing of the socket 1 higher in rigidity. For example, a hard resin, such as, e.g., epoxy resin, phenolic resin, polyimide resin, polycarbonate resin, polyamide resin, polyamide-imide resin, polyester resin, polyphenylene sulfide resin, etc., can be exemplified.

Figure 7:
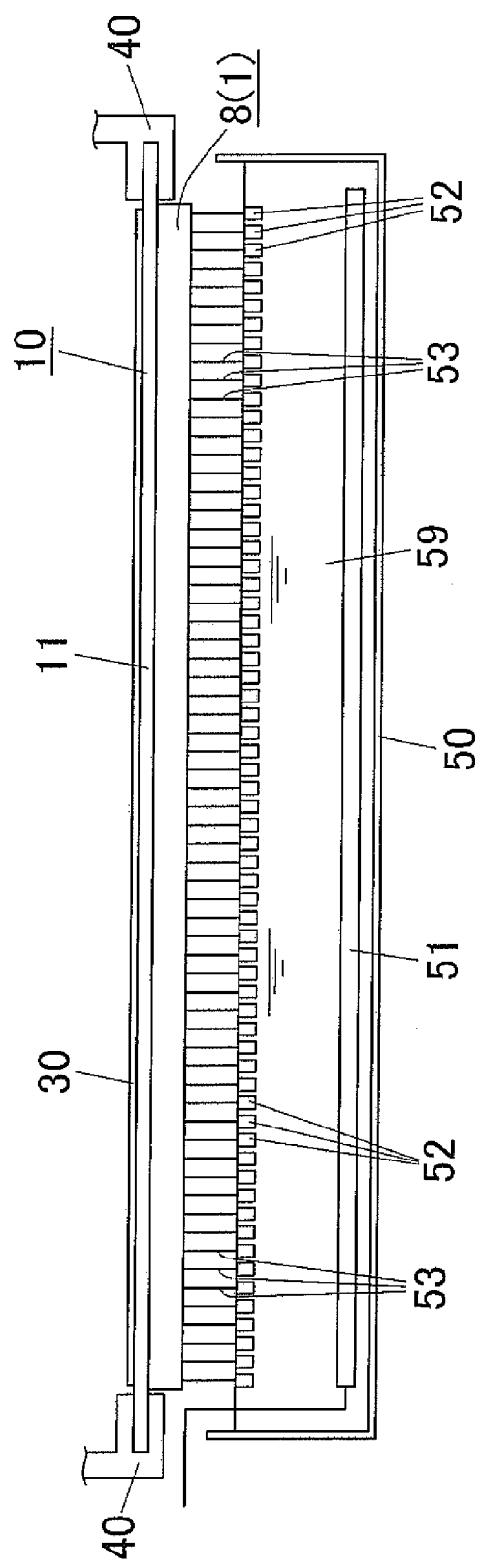
FIG. 7 is a schematic front view showing a method for manufacturing a capacitor element using the jig for manufacturing a capacitor element of the present invention.

Next, the method for manufacturing a capacitor element using the jig 10 for manufacturing a capacitor element will be explained. FIG. 7 shows a schematic diagram of an example of the manufacturing method for a capacitor element. FIG. 9 is a schematic diagram showing the manufacturing method for the capacitor element in an electric circuit manner.

Initially, a processing container 50 in which a processing liquid 59 is filled is prepared. As the processing liquid 59, a chemical conversion treatment solution for forming a dielectric layer 54 and a semiconductor layer forming solution for forming a semiconductor layer 55, etc., can be exemplified.

On the other hand, as shown in FIG. 7, the substrate 11 is held horizontally by gripping both longitudinal end portions of the substrate 11 of the jig 10 for manufacturing a solid electrolytic capacitor element with a gripping portion 40 of a mechanical conveying device (not illustrated).

Figure 8:
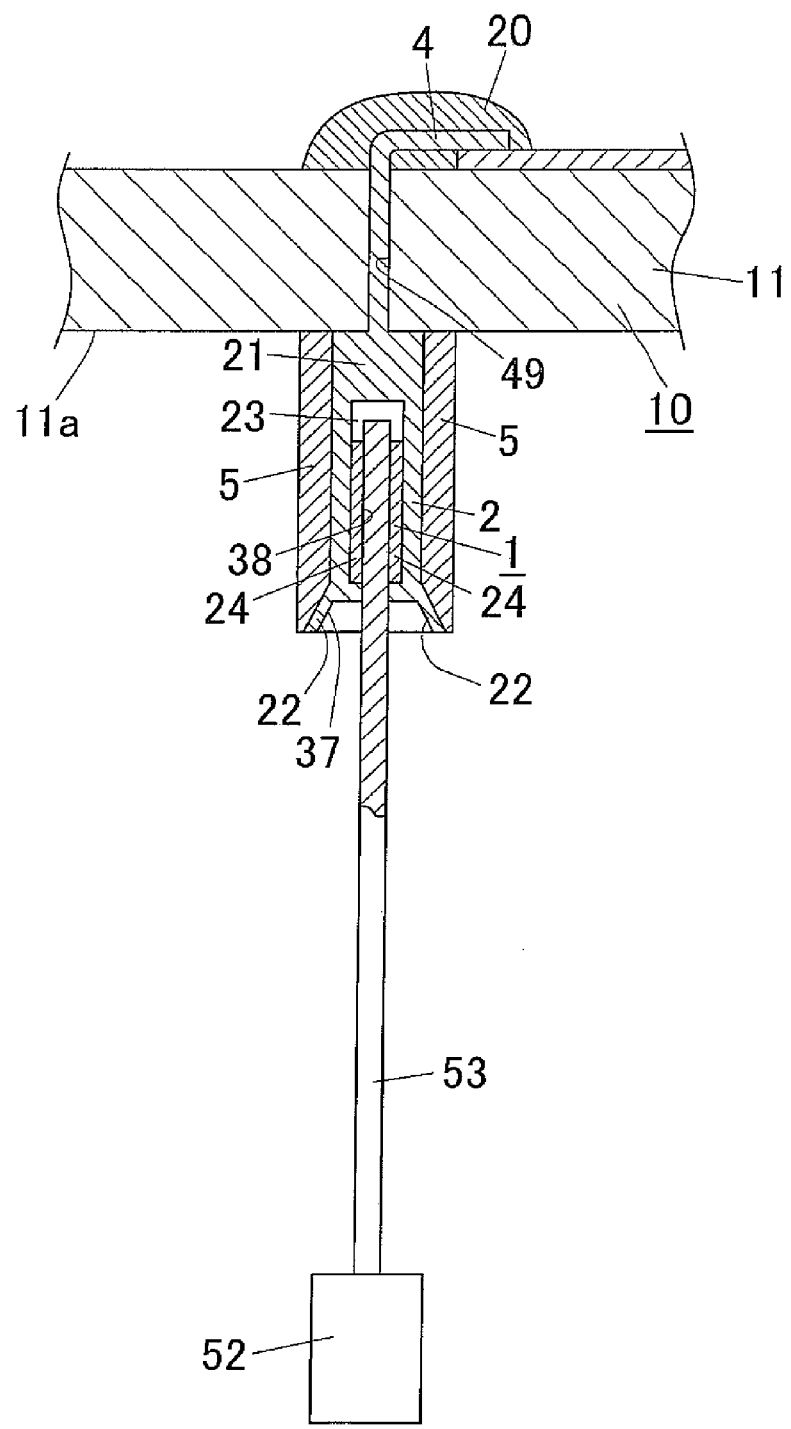
FIG. 8 is a cross-sectional view showing a connection state of the socket and the anode body shown in FIG. 7.

Next, anode bodies (conductors) 52 each having a lead wire 53 are connected to respective sockets 1 mounted on the lower surface of the substrate 11 of the jig 10 for manufacturing a capacitor element (see FIG. 8). Since the tip end side of the lead wire 53 becomes in contact with the metal spring member 24 in the hollow portion 23 of the socket main body 2, the socket 1 and the anode body (conductor) 52 are electrically connected (see FIG. 8). With this, the anode body 52 comes into electrical contact with the electric circuit 30 of the substrate 11 (see FIGS. 7 and 9). The insertion direction of the lead wire 53 to the socket 1 is a perpendicular direction with respect to the substrate 11 (see FIGS. 7 and 8).

Next, the jig 10 for manufacturing a capacitor element in which the anode bodies (conductors) 52 are set is arranged horizontally at an upper position of the processing container 50. While maintaining the horizontal state (a state that the lower surface of the substrate 11 is horizontal) of the manufacturing jig 10, the jig 10 is lowered until at least a part (typically, an entirety) of the anode body (conductor) 52 is immersed in the processing liquid 59, and the jig 10 is fixed at the height position (see FIG. 7).

Figure 11:
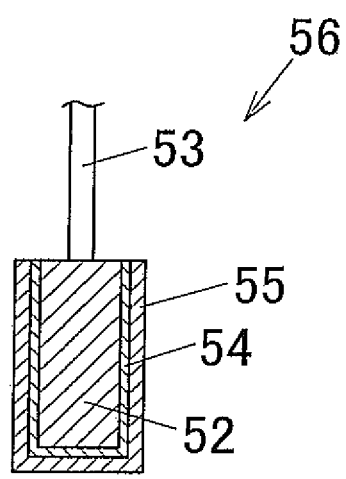
FIG. 11 is a partial cross-sectional view showing an embodiment of a capacitor element to be manufactured by the manufacturing method according to the present invention.

Then, in the immersed state of the anode body (conductor) 52, electric current is applied to the anode body 52 as an anode and a cathode plate 51 arranged in the processing liquid 59 as a cathode (see FIGS. 7 and 9). When a chemical conversion treatment solution is used as the first processing liquid 59, it is possible to form a dielectric layer 54 (see FIG. 11) on the surface of the conductor 52 by the application of an electric current (dielectric layer forming step).

Next, after washing and drying the anode body 52 provided with the dielectric layer 54 on the surface thereof as needed, a semiconductor layer forming solution 59 is newly filled in another processing container 50 different from the aforementioned container. In the same manner, while maintaining the horizontal state of the jig 10 (a state that the lower surface of the substrate 11 is horizontal), the jig is lowered until at least a part (typically, an entirety) of the anode body 52 is immersed in the semiconductor layer forming solution 59, and the jig 10 is fixed at the height position. In this state, by applying an electric current to the anode body 52 as an anode and the cathode plate 51 arranged in the semiconductor layer forming solution 59 as a cathode, that is, by applying an electric current using a semiconductor layer forming solution as the second processing liquid 59, it is possible to form a semiconductor layer 55 on the surface of the dielectric layer 54 of the surface of the anode body 52 (semiconductor layer forming step). Thus, a capacitor element 56 in which the dielectric layer 54 is laminated on the surface of the anode body 52 and the semiconductor layer 55 is further laminated on the surface of the dielectric layer 54 can be manufactured (see FIG. 11).

In the manufacturing method for a capacitor element according to the present invention, for example, between the dielectric layer forming step and the semiconductor layer forming step, and/or after the semiconductor layer forming step, a heat treatment of the anode body 52 can be performed.

The size of the beam member 8 is not especially limited, but can be a size matching the arrangement of the capacitor element at the time of immersing in the processing liquid 59. The width W of the beam member 8 is preferably 1.6 mm to 5.1 mm, more preferably 2 mm to 3 mm. The height H of the beam member 8 is preferably 2 mm to 10 mm, more preferably 3 mm to 5 mm. The length L of the beam member 8 preferably falls within the range that the length is longer than a length capable of accommodating at least the necessary number of sockets 1 but does not stick out of the substrate 11. It is more preferable to be longer within the range. Within the size range, the mechanical conveyance can be performed easily, which makes it possible to obtain a jig 10 higher in rigidity.

The anode body 52 is not especially limited, but at least one type of an anode body selected from the group consisting of a valve metal and a conductive oxide of valve metal can be exemplified, for example. As examples thereof, aluminum, tantalum, niobium, titanium, zirconium, niobium monoxide, zirconium monoxide, etc., can be exemplified.

The shape of the anode body 52 is not especially limited, but a foil shape, a plate shape, a rod shape, a rectangular shape, etc., can be exemplified.

The chemical conversion treatment solution 59 is not especially limited, but, for example, conventionally known solutions in which electrolyte is dissolved or suspended, such as organic acid or salt (for example, adipic acid, acetic acid, adipic acid ammonium, benzoic acid, etc.), inorganic acid or its salt (for example, phosphoric acid, silicate, ammonium phosphate, ammonium silicate, sulfuric acid, ammonium sulfate, etc.) can be exemplified. By applying an electrical current using such chemical conversion treatment solutions, it is possible to form a dielectric layer 54 including insulating metallic oxide such as $Ta_2O_5$, $Al_2O_3$, $Zr_2O_3$, $Nb_2O_5$, etc., on the surface of the anode body 52.

It can be configured such that, by omitting the dielectric layer forming step using such a chemical conversion treatment solution, an anode body 52 in which a dielectric layer 54 has been already provided on the surface thereof is subjected to the semiconductor layer forming step. As such a dielectric layer 54 provided on the surface, a dielectric layer having at least one selected from insulating oxides as a main component, and a dielectric layer conventionally known in the field of a ceramic capacitor or a film capacitor can be exemplified.

The semiconductor layer forming solution 59 is not especially limited as long as it is a solution capable of forming a semiconductor by applying an electric current, and, for example, solutions containing aniline, thiophene, pyrrole, methylpyrrole and substituted derivatives thereof (for example, 3,4-ethylenedioxythiophene, etc.), etc., can be exemplified. A dopant can be further added to the semiconductor layer forming solution 59. The dopant is not especially limited, but a known dopant, etc., such as arylsulfonic acid or its salts, alkyl sulfonic acid or its salts, and various polymer sulfonic acids or its salts can be exemplified. By applying an electric current using such a semiconductor layer forming solution 59, a semiconductor layer 55 made from, for example, a conductive polymer (for example, polyaniline, polythiophene, polypyrrole, polymethylpyrrole, etc.) can be formed on the surface of the dielectric layer 54 on the surface of the anode body 52.

In the present invention, an electrode layer can be provided on the semiconductor layer 55 of the capacitor element 56 obtained by the aforementioned manufacturing method to improve the electrical contact with an extraction electrode terminal (for example, lead frame) of the capacitor.

The electrode layer can be formed by, for example, solidification of conductive paste, plating, metal deposition, and forming of a heat-resistant conductive resin film, etc. It is preferable that the conductive paste is silver paste, copper paste, aluminum paste, carbon paste, nickel paste, etc.

By electrically connecting electrode terminals to the anode body 52 and the semiconductor layer 55 of the capacitor element 56 obtained in such a manner (for example, welding a lead wire 53 to one of the electrode terminals and adhering an electrode layer (semiconductor layer) 55 to the other electrode terminal with silver paste, etc.) and sealing except for a part of the electric terminal, a capacitor can be obtained.

The sealing method is not especially limited, but can be, for example, a resin mold packaging, a resin case packaging, a metal case packaging, packaging by resin dipping, and packaging by a laminate film. Among them, a resin mold packaging is preferred since it is easy to reduce the size and the cost.

EXAMPLES

Next, specific examples of the present invention will be explained, but the present invention is not especially limited by these examples.

Example 1

[Manufacturing of Anode Body (Conductor) 52]

A total of 640 pieces were prepared in each of which a tantalum wire (lead wire) 53 having a length of 10.4±0.3 mm and a diameter of 0.15 mm was planted on the surface (upper surface) of 0.53 mm×0.43 mm of a rectangular shaped tantalum sintered body (anode body) 52 having a length 0.80 mm×a width 0.53 mm×a thickness 0.43 mm. Further, an annular washer made of polytetrafluoroethylene having an outer diameter of 0.40 mm, an inner diameter of 0.10 mm, a thickness of 0.10 mm was mounted to the root of the lead wire 53 (externally mounted).

[Manufacturing of a Jig 10 for Manufacturing a Solid Electrolytic Capacitor Element of the Present Invention]

(Substrate to which an Electronic Component is Mounted)

A glass epoxy substrate having a length 180 mm×a width 96 mm×a thickness 1.6 mm was prepared. In this glass epoxy substrate, a total of 64 pieces of through-holes 49 were formed at 2.54 mm pitches along the lengthwise direction of the substrate, and a total of 10 rows of groups each having a total of 64 through-holes 49 and extending in a row were formed along the widthwise direction of the substrate 11 at 8 mm pitches (in drawings, only 9 rows are illustrated for a drawing reason). That is, a total of 640 through-holes 49 were formed in the glass epoxy substrate 11.

On the substrate 11, electric circuits 30, etc., functioning as a power source for supplying en electric current to the anode body, as shown in FIGS. 2 and 5 previously detailed, were formed. A current limiting terminal 14 and a voltage limiting terminal 15 were provided at an intermediate portion in the lengthwise direction of one of the peripheral portions among a pair of peripheral portions extending in the lengthwise direction of the upper surface of the substrate 11 (see FIGS. 1 and 2).

Also, various electronic components (transistors 19 and resistors 18) were mounted on the substrate 11 with the structures as shown in FIGS. 2-5, and 9 detailed previously. The collector C in each transistor 19 was used as an output. As the resistor 18, a resistor 1 KΩ (error: within ±0.5%) was used, and as the transistor 19, "transistor 2SA2154" made by Toshiba Corporation was used.

A beam member 8 made by polyphenylene sulfide resin (length L: 165.1 mm, width W: 2.54 mm, height H: 4.5 mm) was prepared. In this beam member 8, a total of 64 pieces of sockets 1 were embedded in parallel at 2.54 mm pitches, and each lead wire portion 4 of the socket 1 was drawn out from the upper surface of the beam member 8 (see FIG. 6).

Each lead wire portion 4 of the beam member 8 is inserted into each of the total 640 through-holes 49 formed in the substrate 11, and the upper surface of the beam member 8 was adhered to the lower surface of the substrate 11. Further, the lead wire portion 4 was electrically connected to the output of the power source (see FIGS. 4 and 5). Thus, ten beam members 8 were mounted on the lower surface of the substrate 1 in parallel with each other (see FIGS. 3, 4, 7, and 8).

In this way, a jig 10 for manufacturing a solid electrolytic capacitor element equipped with the substrate 11, the electronic components mounted to the substrate 11, and plural sockets 1 mounted on the lower surface of the substrate 11 was obtained (see FIGS. 1 to 6).

[Manufacturing a Capacitor Element]

As shown in FIG. 7, by gripping both longitudinal edge portions (both end portions of the substrate 11 of FIG. 7 in the longitudinal direction) of the beam member 8 of the jig 10 for manufacturing a solid electrolytic capacitor element with gripping portions 40 of a mechanical conveying device (not illustrated), the substrate 11 was held horizontally.

Next, an anode body (conductor) 52 having a lead wire 53 was connected to each of the plurality of sockets 1 mounted to the lower surface of the substrate 11 of the jig 10 for manufacturing a capacitor element. The inserting direction of the lead wire 53 to the socket 1 was perpendicular to the substrate 11 (see FIGS. 7 and 8).

Next, the jig 10 for manufacturing a capacitor element to which the anode body (conductor) 52 was set was arranged horizontally at an upper position of the metallic (stainless) processing container 50 containing 2 mass % phosphoric acid aqueous solution (processing liquid) 59. The metal processing container 50 also acted as a cathode plate 51.

Using the mechanical conveying device, the jig 10 was lowered while maintaining in a horizontal state so that the entire anode body 52 and the 5 mm of the lower end of the lead wire 53 were immersed in the processing liquid 59 and was fixed at the height position (see FIG. 7). In this immersed state, a voltage was applied between the voltage limiting terminal 15 and the cathode plate 51 (including the metal processing container 50) so that the voltage limiting value (chemical conversion voltage) became 8.3 V, and a voltage was applied between the current limiting terminal 14 and the voltage limiting terminal 15 so that the current limiting value for each anode body became 2.1 mA to apply an electric current. In a state in which the temperature of the chemical conversion treatment solution 59 was maintained at 65° C., anodization was performed for 8 hours to thereby form the dielectric layer 54 on the pore and the outer surface of the conductive sintered body 52 and the surface of a part (5 mm) of the lead wire. During the anodization, in the latter four hours from after 4 hours had passed to 8 hours had passed, the current limiting value was continuously reduced at a rate of 0.5 mA per hour (Dielectric layer forming step).

After washing and drying, the anode body 52 having the dielectric layer 54 on the surface thereof was immersed in a 20 mass % ethylenedioxy thiophene ethanol solution. After filling a semiconductor layer forming solution 59 (a solution including 0.4 mass % of ehtylenedioxy thiophene and 0.6 mass % anthraquinone sulfonic acid in a mixed solvent including 70 mass parts water and 30 mass parts ethylene glycol) in another processing container 50 different from the processing container 50, the jig 10 was lowered while maintaining in the horizontal state so that the entirety of the anode body 52 equipped with the dielectric layer 54 on its surface and the 5 mm of the lower end of the lead wire 53 were immersed in the semiconductor layer forming solution 59, and the jig 10 was fixed at the height position. In this immersed state, 50 minutes of electrolytic polymerization was performed with a constant current of 5 µA per anode body at 20° C. After that, the anode body 52 equipped with the dielectric layer 54 on the surface was pulled out of the solution 59, and washing, alcohol cleansing, and drying were performed. By performing the operations of such electrolytic polymerization (50 minutes of electrolytic polymerization at a constant current of 5 µA per anode body), washing, and alcohol cleansing 6 times, a semiconductor layer 55 made of conductive polymer was formed (semiconductor layer forming step) on the surface of the dielectric layer 54 of the anode body 52 in which the dielectric layer 54 was formed on the surface thereof.

Next, the dielectric layer 54 was restored by performing a chemical reconversion. The chemical reconversion was performed for 15 minutes at a limiting voltage of 6.3 V and a limiting current of 0.1 mA per anode body using the same solution as the anodization (Re-chemical conversion step)

Next, after applying carbon paste (ELECTRODUCK PR-406 made by Acheson, Inc.) on the surface of the semiconductor layer 55 on the anode body, drying was performed by leaving the substrate 11 in a state in which the anode body 52 was connected to the socket 1 for 3 hours in an atmosphere at 150° C. (Carbon layer forming step).

Next, after washing and drying the anode body 52 in which the dielectric layer 54, the semiconductor layer 55, and the carbon layer were laminated, a silver paste was applied to the surface of the carbon layer, and then drying was performed by leaving the substrate 11 in a state in which the anode body 52 was connected to the socket 1 for 4 hours in an atmosphere at 150° C. (Silver paste laminating process). The capacitor element 56 was obtained in this way.

A total of 640 capacitor elements 56 can be manufactured through the set of aforementioned steps. By further executing the step 3 times (that is, 4 times in total), a total of 2,560 capacitor elements 56 were manufactured.

For these 2,560 capacitor elements, the existence of semiconductor layers formed protruding at positions above the polytetrafluoro ethylene washer (thickness 0.10 mm) at the root (base end) of the lead wire 53 was observed visually, but there were 0 protruding semiconductor layers.

Comparative Example 1

A jig for manufacturing a capacitor element was obtained in the same manner as in Example 1 except that a beam member was not used and a total of 640 pieces of sockets 1 were directly mounted on the substrate 11 respectively without embedding in a beam member. That is, the socket 1 was inserted into the through-hole 49 (having a diameter capable of accepting the columnar portion 21 of the socket 1) of the substrate with the upper surface of the socket 1 flush with the upper surface of the substrate, and fixed by filler in a state in which the socket was arranged with the lead wire insertion port faces in the direction of the lower surface of the substrate 11 individually. Further, each socket 1 was electrically connected to each output of the power source constituted by the substrate 11 in the same manner as in Example 1.

Next, for each of the plurality of sockets 1 mounted on the lower surface of the substrate, an anode body (conductor) 52 having a lead wire 53 was connected, similarly to Example 1.

Then, the capacitor element 56 was manufactured by performing the subsequent steps (dielectric layer forming step, etc.) as similarly to Example 1.

A total of 640 capacitor elements 56 can be manufactured using the set of aforementioned steps. By further executing these steps 3 times (that is, 4 times in total), a total of 2,560 capacitor elements 56 were manufactured.

The number of elements having semiconductor layers formed protruded at positions above the polytetrafluoro ethylene washer (thickness 0.10 mm) at the root (base end) of the lead wire 53 was 1,352. In this Comparative Example 1, from the third implementation, warping deformations occurred relatively significantly to the glass epoxy substrate maintained horizontally, and after the third implementation, the number of elements in which the semiconductor layer was formed protruding from a position above the washer significantly increased.

This application claims priority under 35 U.S.C. §119 to Japanese Patent Application No. 2011-288070 filed on Dec. 28, 2011, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

INDUSTRIAL APPLICABILITY

A jig for manufacturing a capacitor element according to the present inventions can be preferably used as a jig for manufacturing an electrolytic capacitor element, but not limited to such usage. The capacitor obtained by the manufacturing method for the present invention can be used in electronic devices, such as, e.g., digital devices including personal computers, cameras, game machines, AV devices, cellular phones, etc., or various electronic power sources.

DESCRIPTION OF SYMBOLS

1 . . . socket
2 . . . socket main body
4 . . . lead wire portion
5 . . . insulating portion
8 . . . beam member
10 . . . jig for manufacturing a capacitor element
11 . . . substrate
14 . . . current limiting terminal
15 . . . voltage limiting terminal
18 . . . resistor
19 . . . transistor
30 . . . electric circuit
32 . . . electric power source
37 . . . lead wire insertion port
49 . . . through-hole
51 . . . cathode plate
52 . . . anode body(conductor)
53 . . . lead wire
54 . . . dielectric layer
55 . . . semiconductor layer
56 . . . capacitor element
59 . . . processing liquid(chemical conversion treatment solution, semiconductor layer forming solution)

The invention claimed is:

1. A jig for manufacturing a capacitor element, comprising:
a substrate;
a plurality of beam members arranged on at least one surface of the substrate in parallel to each other; and
a plurality of conductive sockets mounted on the beam member,
wherein the plurality of sockets are capable of being electrically connected to a power source supplying an electric current to a capacitor anode body, and
wherein the socket is provided with an insertion port for a lead wire of a capacitor anode body for use in electrically connecting the lead wire to the socket, the insertion port being opened in a downward direction of the substrate.

2. The jig for manufacturing a capacitor element as recited in claim 1, wherein the beam member is 1.6 mm to 5.1 mm in width and 2 mm to 10 mm in height.

3. The jig for manufacturing a capacitor element as recited in claim 1, wherein the beam member contains hard resin.

4. The jig for manufacturing a capacitor element as recited in claim 1,
wherein the power source is an electric circuit formed on at least one surface of the substrate, and
wherein each socket is electrically connected to respective power sources, and is electrically insulated with each other except that the socket is connected to the power source.

5. The jig for manufacturing a capacitor element as recited in claim 4, wherein the electric circuit is a constant current circuit.

6. The jig for manufacturing a capacitor element as recited in claim 4, wherein the electric circuit is also a circuit for limiting a voltage every socket.

7. A method for manufacturing a capacitor element, comprising:
a dielectric layer forming step of forming a dielectric layer on a surface of an anode body by energizing the anode body as an anode in a state in which the capacitor anode body is connected to the socket of the jig for manufacturing a capacitor element as recited in claim 1, the substrate is held horizontally with both longitudinal edge portions of the beam member gripped, and the anode body is immersed in a chemical conversion treatment solution.

8. A method for manufacturing a capacitor element, comprising:
a semiconductor layer forming step of forming a semiconductor layer on a surface of a dielectric layer on a surface of an anode body by energizing the anode body as an anode in a state in which the capacitor anode body is connected to the socket of the jig for manufacturing a capacitor element as recited in claim 1, the substrate is held horizontally with both longitudinal edge portions of the beam member gripped, and the anode body is immersed in a semiconductor layer forming solution.

9. A method for manufacturing a capacitor element, comprising:
a dielectric layer forming step of forming a dielectric layer on a surface of an anode body by energizing the anode body as an anode in a state in which the capacitor anode body is connected to the socket of the jig for manufacturing a capacitor element as recited in claim 1, the substrate is held horizontally with both longitudinal edge portions of the beam member gripped, and the anode body is immersed in a chemical conversion treatment solution,
a semiconductor layer forming step of forming a semiconductor layer on a surface of a dielectric layer on a surface of the anode body by energizing the anode body as an anode in a state in which after the dielectric layer forming step, the substrate in a state in which the anode body is connected to the socket is held horizontally, and the anode body is immersed in a semiconductor layer forming solution.

10. A method for manufacturing a capacitor in which the anode body and the semiconductor layer of the capacitor element obtained by the manufacturing method as recited in claim 7 are electrically connected to electrode terminals respectively and sealed except for a part of the electrode terminal remained.

* * * * *